(12) United States Patent
Sullivan

(10) Patent No.: US 6,610,224 B2
(45) Date of Patent: Aug. 26, 2003

(54) PROCESSES FOR PRODUCING MONOLITHIC ARCHITECTURAL CEMENTITIOUS STRUCTURES HAVING DECORATIVE AGGREGATE-CONTAINING CEMENTITIOUS SURFACES

(75) Inventor: Francis W. Sullivan, Newport Beach, CA (US)

(73) Assignee: Sullivan Concrete Textures, Costa Mesa, CA (US)

( * ) Notice: Subject to any disclaimer, the term of this patent is extended or adjusted under 35 U.S.C. 154(b) by 0 days.

(21) Appl. No.: 10/058,932

(22) Filed: Jan. 28, 2002

(65) Prior Publication Data

US 2002/0157577 A1 Oct. 31, 2002

Related U.S. Application Data

(60) Provisional application No. 60/270,732, filed on Feb. 22, 2001.

(51) Int. Cl.[7] .............................. E04B 1/16; E04B 5/32; E01C 7/14
(52) U.S. Cl. ...................... 264/34; 264/139; 264/256; 264/333; 264/341; 106/737; 106/738; 106/763; 106/764; 106/816; 106/817
(58) Field of Search ........................ 264/34, 139, 256, 264/333, 341; 106/737, 738, 763, 764, 816, 817

(56) References Cited

U.S. PATENT DOCUMENTS

| 772,476 | A | | 10/1904 | Podmore |
|---|---|---|---|---|
| 829,753 | A | | 8/1906 | Badagliacca |
| 1,361,763 | A | | 12/1920 | Hamil |
| 1,486,208 | A | * | 3/1924 | Weber |
| 2,277,203 | A | * | 3/1942 | Boult |
| 2,296,453 | A | * | 9/1942 | Saffert |
| 3,608,038 | A | * | 9/1971 | Smith .................... 264/162 |

(List continued on next page.)

FOREIGN PATENT DOCUMENTS

| GB | 2105613 A | 3/1983 |
|---|---|---|
| JP | 2269252 | 11/1990 |

OTHER PUBLICATIONS

Desing and Control of Concrete Mixtures, 13th Ed., by Steven H. Kosmatka and William C. Panarese, Portland Cement Association, 1994, pp. 15–17 & 19–22.

ASTM Designation: C618–01. Standard Specification for Coal Fly Ash and Raw or Calcined Natural Pozzolan for Use as a Mineral Admixture in Concrete, four (4) pages. Published Sep. 2001.

Primary Examiner—Richard Crispino
Assistant Examiner—Michael I. Poe
(74) Attorney, Agent, or Firm—F. Eugene Logan

(57) ABSTRACT

A decorative aggregate-containing cementitious slurry having decorative aggregate and cementitious matrix composition forms a monolithic structure when effectively applied to a freshly poured cementitious base and simultaneously cured therewith. The slurry and the base are cured for a time sufficient for producing the monolithic structure with a decorative aggregate-containing cementitious surface. The slurry produces a decorative aggregate-containing cementitious layer having a cured thickness effective for permanently securing the decorative aggregate therein with a portion of the decorative aggregate exposed. Various decorative surfaces are produced without requiring expensive hand broadcasting of the decorative aggregate, and without expensive surface grinding. Dry components of the slurry are decorative aggregate and decorative cementitious matrix blend. The blend at least has between about 50% and about 79% blended quartzitic silica, between about 20% and about 35% Portland cement, silica fume up to about 5%, and optionally up to about 8% Class C-like fly ash.

39 Claims, 2 Drawing Sheets

U.S. PATENT DOCUMENTS

| | | | | |
|---|---|---|---|---|
| 4,049,874 A | * | 9/1977 | Aoyama et al. | 264/256 |
| 4,134,956 A | * | 1/1979 | Suzuki et al. | 106/666 |
| 4,198,472 A | * | 4/1980 | Brown | 106/666 |
| 4,205,040 A | * | 5/1980 | Aoyama et al. | 264/233 |
| 4,496,504 A | | 1/1985 | Steenson et al. | 264/69 |
| 4,748,788 A | | 6/1988 | Shaw et al. | 52/742 |
| 4,992,102 A | | 2/1991 | Barbour | 106/645 |
| 5,246,650 A | | 9/1993 | Clark | 264/87 |
| 5,252,636 A | * | 10/1993 | Ellenberger et al. | 523/401 |
| 5,266,111 A | | 11/1993 | Barbour | 106/709 |
| 5,339,589 A | | 8/1994 | Thrower | 52/318 |
| 5,441,677 A | | 8/1995 | Phillips, Sr. | 264/31 |
| 5,447,752 A | * | 9/1995 | Cobb | 264/31 |
| 5,520,730 A | | 5/1996 | Barbour | 106/707 |
| 5,794,401 A | | 8/1998 | Shaw et al. | 52/741.41 |
| 6,016,635 A | | 1/2000 | Shaw et al. | 52/741.41 |
| 6,033,146 A | | 3/2000 | Shaw et al. | 404/20 |

* cited by examiner

PROCESSES FOR PRODUCING MONOLITHIC ARCHITECTURAL CEMENTITIOUS STRUCTURES HAVING DECORATIVE AGGREGATE-CONTAINING CEMENTITIOUS SURFACES

CROSS-REFERENCE TO RELATED APPLICATIONS

This application claims the benefit of the priority of U.S. Provisional Application Ser. No. 60/270,732, filed Feb. 22, 2001 and entitled "PROCESSES FOR PRODUCING MONOLITHIC ARCHITECTURAL CEMENTITIOUS STRUCTURES HAVING DECORATIVE AGGREGATE-CONTAINING CEMENTITIOUS SURFACES."

BACKGROUND OF THE INVENTION

Methods to incorporate varicolored fragments of material in wall surfaces have been known. For example, U.S. Pat. No. 772,476 discloses a method of veneering artificial stone by depositing a layer of cement on the face of a block, sprinkling granular material thereon, tamping the granular material and smoothing the surface by rubbing or grinding the exposed granules.

U.S. Pat. No. 1,361,763 discloses a method of mixing foreign particle with a conventional plastic mixture, which is then applied directly to the surface to be covered.

U.S. Pat. No. 4,496,504 discloses a method of exposing aggregate in poured concrete panels by pouring wet concrete having a coarse aggregate content into a casting bed, lifting coarse aggregate to the surface with a rotating aggregate lifter and depositing a high concentration of the coarse aggregate in front of a screed roller, and compacting.

U.S. Pat. No. 5,339,589 produces an aggregate floor by applying a layer of a flexible compound to a concrete slab, applying fiber glass mesh to the flexible compound, applying dry aggregate to the mesh and compacting with a vibrating roller, then applying thereto a compacted composite cement, water and sand in the form of a viscous solution, and then compacting with a roller to force out excess cement and trapped air.

U.S. Pat. No. 5,794,401 discloses a method of resurfacing existing floors or substrates by cleaning the surface of the substrate and applying a seed material mixed with a cementitious self-leveling topping, then curing, then grinding the exposed cured surface, and then sealing.

U.S. Pat. Nos. 6,016,635 and 6,033,146 disclose methods for surface seeding or broadcasting particulate over the surfaces of poured concrete mixes while the top surfaces are still plastic.

The above methods either:
1. Do not form monolithic structures, or
2. Disperse the relatively expensive decorative aggregate throughout the entire structure thereby increasing cost, or
3. Require labor intensive hand seeding or broadcasting of the decorative aggregate, or
4. Require a labor intensive and hence costly grinding step.

A method without any of these disadvantages would reduce the cost and/or increase the durability of the structure by making the structure monolithic.

SUMMARY OF THE INVENTION

This invention is directed towards processes for producing durable and attractive decorative aggregate-containing cementitious surfaces that are an integral part of monolithic structures.

This invention is also directed towards processes that:
1. Can produce such surfaces at a much lower cost by not requiring hand seeding or broadcasting of decorative aggregate over the top of such surfaces during their manufacture.
2. Do not required decorative aggregate throughout the entire monolithic structure.
3. Do not require grinding the cured surfaces.

This invention can be used on monolithic structures having any strength desired and suitable for usage ranging from light pedestrian traffic on home patios to heavy vehicular traffic. This invention is intended for new monolithic structures in compliance with the least stringent specifications to the most stringent specifications depending only on the required duty that such monolithic structures are to serve. For example, this invention can produce monolithic structures having strength ratings of 2200 psi, 3000 psi, 4000 psi or higher if desired. Unless otherwise specified all psi strength rating referred herein are concrete compressive strengths at 28 days.

Accordingly, there is provided by the principles of this invention a process for producing a monolithic architectural cementitious structure having a decorative aggregate-containing cementitious surface comprising forming a freshly poured cementitious base. The cementitious base does not contain any decorative aggregate. With reference to FIG. 1, a compacted subgrade material 20 is preferably first laid on a rough graded site 21. Then reinforcing bar or rebar, or wire mesh 22 is set to reinforce the ultimately formed monolithic structure. Next a cementitious base 23 is produced and laid from suitable formulation having the strength properties required. Usually the decorative aggregate-containing cementitious portion of such structure is between 2% and 17% of the total thickness of monolithic architectural cementitious structure while the cementitious base is between 98% and 83% of said total thickness. In one embodiment, the freshly poured cementitious base 23 has a thickness of at least about 3 inches.

By the term "decorative aggregate" as used herein is meant aggregate that is used to produce an attractive or architectural surface. The term "decorative aggregate" as used herein is not meant to include any aggregate used for merely adding strength to the monolithic structure without also enhancing the beauty of the surface. For example, No. 4 aggregate, which is used in many concrete mixes for strength, is not a "decorative aggregate" as that term is used herein. The appearance of decorative aggregate is not the same as the appearance of the aggregate in the cementitious base. Thus the aggregate used for adding strength to the cementitious base not the same as the decorative aggregate used for producing the attractive surfaces of this invention.

Since the decorative aggregate is relatively expensive material there is substantial cost savings in this process since the cementitious base does not contain the relatively expensive decorative aggregate. Furthermore, since the formulation of the decorative aggregate-containing cementitious slurry is relatively more expensive per unit volume than the formulation of the cementitious base per unit volume, the cost of producing the monolithic architectural cementitious structures with the decorative aggregate-containing surfaces is reduced when thickness of the decorative aggregate-containing cementitious layer is reduced. However, said thickness must be effective for securing and locking in the exposed decorative aggregate.

With reference to FIG. 2, this invention further comprises preparing a decorative aggregate-containing cementitious slurry 24 having at least decorative aggregate 26 and cementitious matrix composition 28 (also referred to herein as the decorative cementitious matrix blend) operable for forming a monolithic structure when applied to the freshly poured cementitious base and simultaneously cured therewith. In one embodiment of this invention, the cementitious matrix composition 28 comprises water, silica sand and cement. Silica sands can be, for example, blended quartzitic silica. Silica sands and blended quartzitic silica are available in several colors including light or white tones and darker colors. Preferably, when the decorative cementitious matrix blend is not required to be white or light color in tone, the cement is Type V Portland cement or equivalent cement having low permeability. The low permeability is desirable because it is more resistant to sulfates in the soil, salty sea breezes, and other concrete-detrimental salts.

However, when the decorative cementitious matrix blend is required to be white or light color in tone, a white Portland cement is used since Type V Portland cement has a darker appearance. To maintain the light color of the decorative cementitious matrix blend when using white Portland cements, any fly ash present in the formulation should be replaced by an additional amount or percent of white Portland cement. As stated at page 17 of Kosmatka and Panarese, "Design and Control Of Concrete Mixtures", 13th Edition, Portland Cement Association, 1994, 4th printing, white Portland cement is a true Portland cement that differs from gray cement chiefly in color. It is made to conform to the specifications of ASTM C150, usually Type I or Type III, but the manufacturing process is controlled so that the finished product will be white. White Portland cement is made from selected raw materials containing negligible amounts of iron and magnesium oxides, i.e. the substances that give cement its gray color; see TABLE 1. Its use is recommended whenever white or colored concrete is desired. Usually, white Portland cement is equivalent in strength to Type I or Type III Portland cement.

Chemical and compound composition and fineness of some typical Portland cements can be found at page 21 of the above-mentioned "Design and Control Of Concrete Mixtures" publication and also in Kirk and Othmer, eds., "Cement," Encyclopedia of Chemical Technology, 3rd ed., vol. 5, John Wiley & Sons, Inc., New York, 1979, pages 163–193, and which is also shown in TABLE 1 for Portland cement Types I, III and white. Variations in the this data will occur from one cement source to another, however, such variations are still considered to fall within the specification of ASTM C150, which is hereby entirely incorporated herein by reference. These references should be consulted for more in-depth explanation of the effect of such parameters on concrete.

In one embodiment the cementitious composition comprises silica fume for improving strength and securing the decorate aggregate. Condensed silica fume is a by-product from silicon and ferrosilicon industries, where these metals are produced in submerged electric arc furnaces. The fume from these processes forms minute, glassy, spherical particles referred to as microsilica or silica fume that is considered a waste product of limited value. Microsilica is an extremely fine particulate, with average diameters 100 times finer than cement particles and is almost pure silicon dioxide or $SiO_2$. Most condensed silica fume has an average size of about 0.15 micrometers, while a typical Portland cement has an average particle size of 15 micrometers.

Since silica fume speeds up the rate of cure effective retardants can be added if needed to allow more time for the resultant slurry to be worked. For example a small amount of fly ash Class C is added as a retardant where the decorative aggregate is ¼ inch or larger and where the resulting decorative surface is not required to be white or light color in tone. As disclosed by ASTM designation C618-01, published September 2001 and in U.S. Pat. Nos. 4,992,102 and 5,266,111 and 5,520,730, Class C fly ash is normally produced from lignite or subbituminous coal. This class of fly ash, in addition to having pozzolanic properties also has some cementitious properties. Some Class C fly ash may contain lime contents higher than 10%. Class C and F fly ash is characterized by American Society of Testing Materials (ASTM) Standard C618 that sets forth the following chemical (oxide basis) and physical requirements:

| C | F | Class |
|---|---|---|
| 50% | 70% | Minimum $SiO_2 + Al_2O_3 + Fe_2O_3$ |
| 5% | 5% | Maximum sulfur trioxide ($SO_3$) |
| 3% | 3% | Maximum moisture content |
| 6% | 6% | Maximum loss on ignition |
| 34% | 34% | Maximum amount retained when wet-sieved on 35 microns (No. 325) sieve. |

Class F fly ash normally produced from burning anthracite or bituminous coal has pozzolanic properties. The reference to "pozzolanic properties" refers to the capability of certain mixtures that are not in themselves cementitious of undergoing a cementitious reaction when mixed with lime in the presence of water. Class C fly ash possesses direct cementitious properties as well as pozzolanic properties. U.S. Pat. Nos. 4,992,102 and 5,266,111 and 5,520,730, disclose how to produce synthetic Class C fly ash from Class F fly ash and cement kiln dust and are hereby entirely incorporated herein by reference. Synthetic Class C fly ash and other equivalent materials thereof can be used in this invention. Accordingly, by the expression "Class C-like" fly ash as used herein is meant to include Class C fly ash, synthetic Class C fly ash and fly ash that has both pozzolanic properties and cementitious properties equivalent to Class C fly ash. Class F fly ash without CKD can also be used in place of the above-mentioned synthetic Class C fly ash, however it would not be as effective.

Superplasticizers can also be added to the decorative cementitious matrix blend to make a flowing concrete and/or to reduce water content to gain higher early strengths, for example polymer containing WRDA®-19 brand superplasticizer and chemical dispersants containing DARACEM®-100 brand superplasticizer of W. R. Grace & Co.

In one embodiment, the process further comprising leaving a rough, unsmoothed and wet surface 30 on the freshly poured cementitious base, and pouring the decorative aggregate-containing cementitious slurry 24 on the rough, unsmoothed and wet surface 30.

Non-limiting examples of decorative aggregate 26 are natural hard materials, synthetic hard materials, and mixtures thereof that form decorative aggregate-containing cementitious surfaces. Other non-limiting examples are decorative aggregate is selected from the group consisting of ceramic, ceramic chips, marble, marble chips, granite, granite chips, sea shells, sea shells chips, sea crustacean remains, fragments of sea crustacean remains, glass, glass chips, natural aggregates selected for their color, natural aggregates selected for their texture, natural aggregates selected for their attractiveness and strength, and mixtures thereof.

In one embodiment of this invention, the decorative aggregate has a size between about 1/32 inch and about ½ inch. In another embodiment, the decorative aggregate has a size between about 1/32 inch and about ⅜ inch. Sizes of the decorative aggregate when referred herein mean the mean diameter of the decorative aggregate unless otherwise specified.

In one embodiment, the process further comprising removing detrimental material, including dirt and grit, from the decorative aggregate before preparing the decorative aggregate-containing cementitious slurry.

The process further comprises pouring an amount of the decorative aggregate-containing cementitious slurry 24 on the freshly poured cementitious base within a period of time after forming the freshly poured cementitious base, effective for forming a monolithic structure, when simultaneously cured with the freshly poured cementitious base. The amount of the decorative aggregate-containing cementitious slurry 24 must be sufficient to produce a decorative aggregate-containing cementitious layer having a thickness 31 operable, when cured, for permanently securing the decorative aggregate therein. Furthermore, at least a portion of the decorative aggregate forms a portion of the exposed surface of the decorative aggregate-containing cementitious layer.

In one embodiment, the period of time for pouring the decorative aggregate-containing cementitious slurry on the freshly poured cementitious base between about one minute and no more than about 3 hours from the time of completing the pouring of the freshly poured cementitious base. In another embodiment, the period of time for pouring the decorative aggregate-containing cementitious slurry on the freshly poured cementitious base is immediately after, or as soon as possible after, completing the pouring of the freshly poured cementitious base.

The one embodiment, the process further comprises adding and mixing a colorant in the decorative aggregate-containing cementitious slurry before pouring the slurry on the freshly poured cementitious base.

The process further comprises simultaneously curing (1) the decorative aggregate-containing cementitious slurry poured on the freshly poured cementitious base, with (2) the freshly poured cementitious base, for a period of time effective for producing a monolithic architectural cementitious structure 32 having a decorative aggregate-containing cementitious surface 34, as represented in FIG. 3, in which the boundary 36 seen in FIG. 2, between the earlier poured cementitious base 23 and the decorative aggregate-containing cementitious slurry 24 has vanished due to the cementitious reaction resulting from the curing process thereby producing a monolithic structure.

The period of time for a 75% cure of the decorative aggregate-containing cementitious slurry and the freshly poured cementitious base is about 7 days under normal conditions.

In one embodiment, in about 30 minutes after pouring the decorative aggregate-containing cementitious slurry, the process further comprises leveling the decorative aggregate-containing cementitious surface. In another embodiment, in about 30 minutes after leveling the decorative aggregate-containing cementitious surface, the process further comprises bullfloating the decorative aggregate-containing cementitious surface and forming a smoothed surface. In still another embodiment, in about 60 minutes after bullfloating the decorative aggregate-containing cementitious surface and forming the smoothed surface, the process further comprises troweling and sponging the decorative aggregate-containing cementitious surface to further enhancing the appearance thereof.

In a further embodiment, the process comprises, after about 7 days of curing the decorative aggregate-containing cementitious slurry with the freshly poured cementitious base, washing the decorative aggregate-containing cementitious surface with a dilute acid to brighten exposed decorative aggregate.

In another embodiment, after washing the decorative aggregate-containing cementitious surface with a dilute acid to brighten exposed decorative aggregate, the process further comprises testing the surface to determine if the dilute acid has been neutralized, and after the testing shows that the surface has been neutralized, sealing the surface with a sealant effective for protecting the surface. The dilute acid will become neutralized in about 2 to about 8 days after the dilute acid washing.

In one embodiment, the thickness 31 of the decorative aggregate-containing cementitious layer is at least about 1/16 inch. In another embodiment, the monolithic architectural cementitious structure has a thickness 38 of at least about 3 5/8 inches, i.e. nominally 4 inches.

There is also provided by the principles of this invention decorative cementitious matrix blends comprising blended quartzitic silica, Portland cement, and silica fume, which when mixed with an effective amount of water, followed by mixing with a predetermined amount of decorative aggregate can be used to form the decorative aggregate-containing surfaces of this invention. In one embodiment, the decorative cementitious matrix blend also comprises a small amount Class C-like fly ash as a curing retardant. Minor amounts of other accelerants, retardants, and/or hardeners can, of course, be used if desired.

In one embodiment, the effective amount of water that is added to the decorative cementitious matrix blend and of decorative aggregate forms a slurry having sufficient fluidity that the slurry can be worked through the last troweling step of producing the smooth decorative aggregate-containing surface. However, said amount of water shall be limited so that it does not produce surface shrinkage cracking the first day of curing, nor premature surface wearing thereafter.

In one embodiment, the effective amount of water that is added to the decorative cementitious matrix blend and of decorative aggregate forms a slurry having a slump between about 3 inches and 5 inches.

In one embodiment, the dry components comprise about 60 parts of decorative cementitious matrix blend and about 40 parts of decorative aggregate, which is then slurried with water to produce the decorative aggregate-containing cementitious slurry.

In one embodiment, the decorative cementitious matrix blend contains between about 20% and about 35% of Portland cement or equivalent cement thereto, preferably between about 22% and about 33%, and especially preferably between about 25% and about 32%.

In one embodiment, the decorative cementitious matrix blend contains between about 50% and about 79% blended quartzitic silica or an equivalent silica thereto, preferably between about 35% and 45%, and especially preferably about 40%.

In another embodiment, the blended quartzitic silica, when graded using Standard Sieve Sizes 16, 20, 30 and 60 for such analyses, is about 25% Standard sieve size 16, about 37% Standard sieve size 20, about 25% Standard sieve size 30, and about 13% Standard sieve size 60.

In another embodiment, the decorative cementitious matrix blend contains silica fume up to about 5%, and preferably between about 0.1% and about 4%, and especially preferably between about 1.5% and about 3.5% as a strengthening and binding agent.

In still another embodiments that include decorative aggregates larger that about ¼ inch and that are not used to form white or light colored surfaces, the decorative cementitious matrix blend contains Class C-like fly ash up to about 8%, and preferably between about 5% and about 7%, as a retardant.

In one embodiment, the ratio of cement to blended quartzitic silica is between about ¹⁰⁄₄₀ (25%) and about ²⁵⁄₄₀ (63%), preferably between about ¹²⁄₄₀ (30%) and about ²²⁄₄₀ (55%), and especially preferably between about ¹⁵⁄₄₀ (37%) and about ²⁰⁄₄₀ (50%).

In one embodiment, the ratio of silica fume to blended quartzitic silica is up to about ⁴⁄₄₀ (10%), preferably between about ⁰·⁵⁄₄₀ (1%) and about ²⁄₄₀ (5%), and especially preferably between about ¹⁄₄₀ (2.5%) and about ²⁄₄₀ (5%).

In one embodiment, the ratio of decorative aggregate to decorative cementitious matrix blend is between about ²⁰⁄₆₀ (33%) and about ⁵⁰⁄₆₀ (83%), preferably between about ³⁵⁄₆₀ (58%) and about ⁴⁵⁄₆₀ (75%), and especially preferably about ⁴⁰⁄₆₀ (67%).

In one embodiment, the ratio of cement to decorative aggregate is between about ¹⁰⁄₄₀ (25%) and about ³⁰⁄₄₀ (75%), preferably between about ¹²⁄₄₀ (30%) and about ²⁵⁄₄₀ (63%), and especially preferably between about ¹⁵⁄₄₀ (37%) and about ²⁰⁄₄₀ (50%).

In one embodiment, the ratio of silica fume to decorative aggregate is up to about ⁴⁄₄₀ (10%), preferably between about ¹⁄₁₀₀ (1%) and about ³⁄₄₀ (7.5%), and especially-preferably between about ¹⁄₄₀ (2.5%) and about ²⁄₄₀ (5%).

In one embodiment, the size of the decorative aggregate is no greater about ½ inch, preferably no greater than about ⅜ inch, and especially preferably no greater than about ¼ inch.

In another embodiment, the size of the decorative aggregate is between about ¹⁄₃₂ inch and about ½ inch, preferably between about ¹⁄₃₂ inch and about ⅜ inch, and especially preferably between about ¹⁄₃₂ inch and about ¼ inch.

DESCRIPTION OF THE PREFERRED EMBODIMENTS

Figure 1:
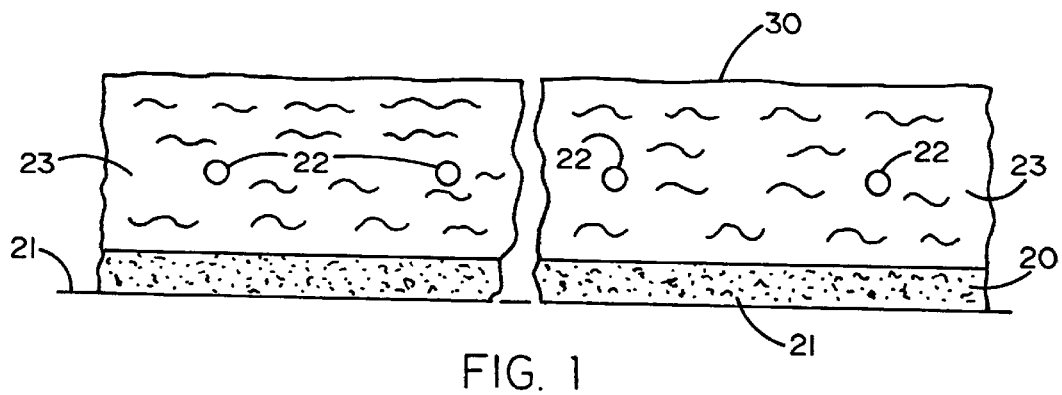
FIG. 1 is an elevational and cross-sectional view of cementitious matrix composition poured on a prepared subgrade material.
Figure 2:
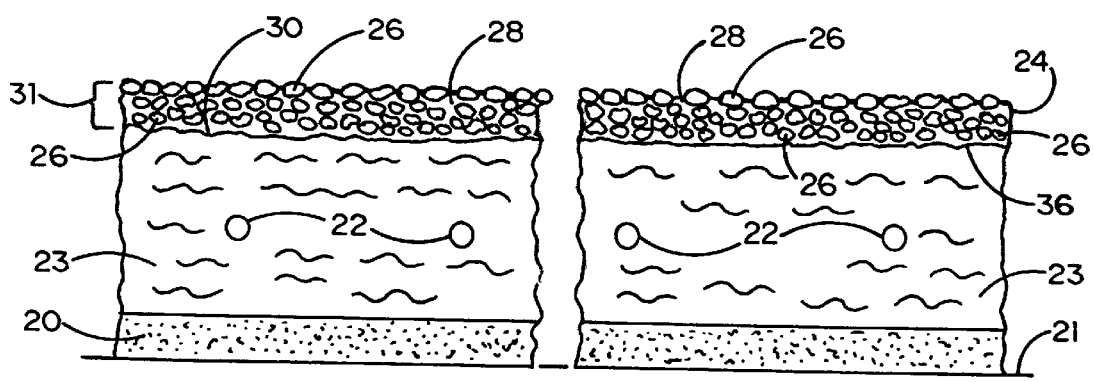
FIG. 2 is an elevational and cross-sectional view of a decorative aggregate-containing cementitious slurry poured on top of the rough, unsmoothed and wet surface of the cementitious matrix composition of FIG. 1.
Figure 3:
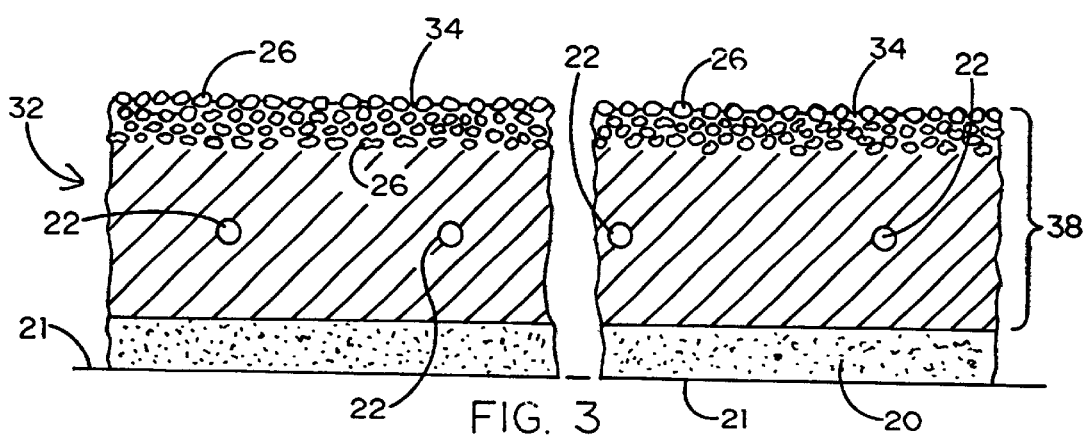
FIG. 3 is an elevational and cross-sectional view of a monolithic architectural cementitious structure having a decorative aggregate-containing cementitious surface resulting from the curing of the formation of FIG. 3.
Figure 4:
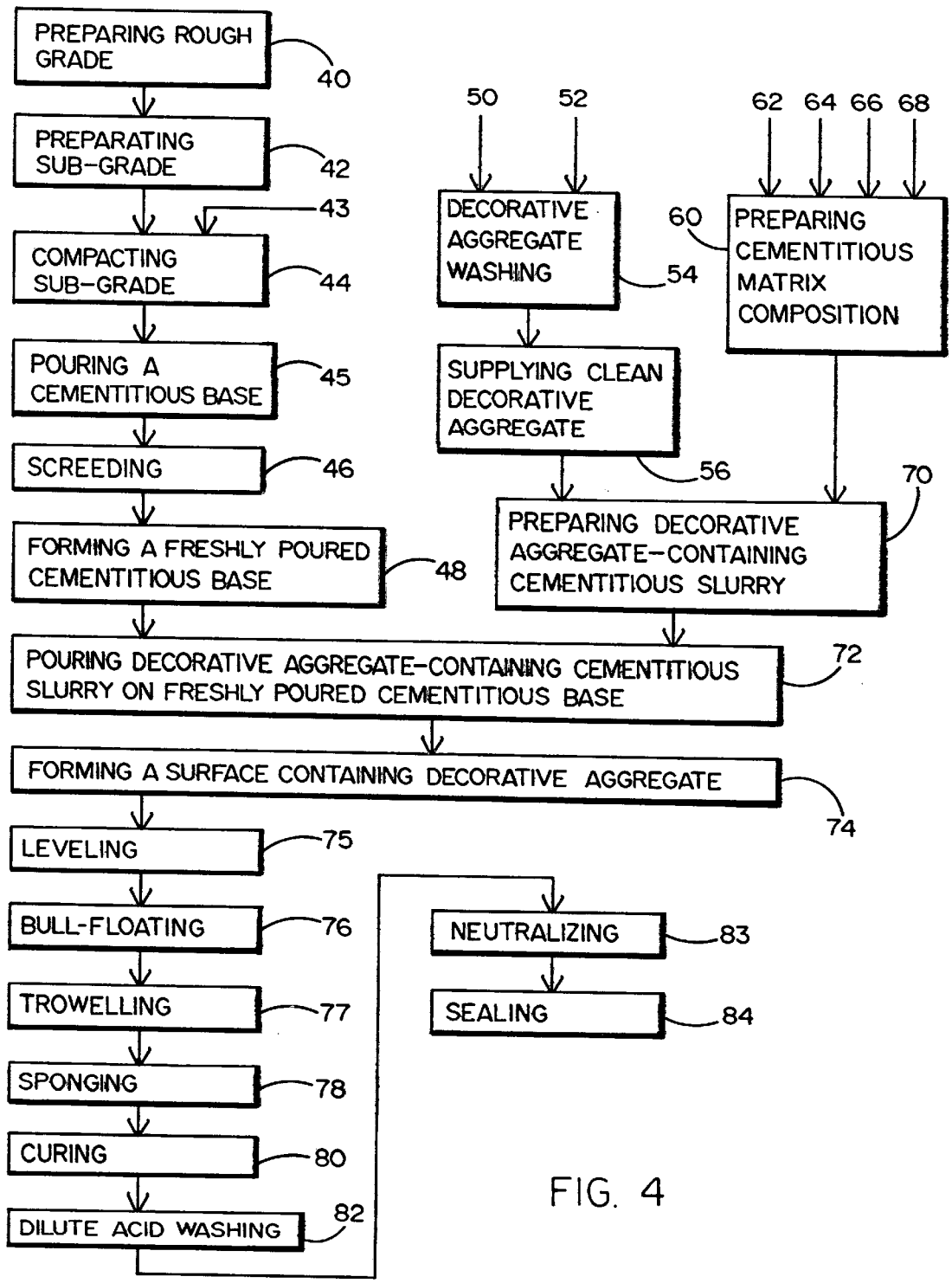
FIG. 4 is flow diagram of a process for producing a monolithic architectural cementitious structure having a decorative aggregate-containing cementitious surface beginning with preparing a rough graded site to sealing the produced surface.

Referring to FIG. 4, a flow diagram of the preferred processing steps of this invention for producing a monolithic architectural cementitious structure suitable for continuous traffic begins with rough grading an identified site in step 40 to a first predetermined elevation by grading the site to ±0.1 ft of specification. Thereafter, if required, installing on the rough graded site a subgrade material 20, in step 42, selected from the group consisting of sand, and crushed aggregate and mixtures thereof, or other subgrade material, and compacting the subgrade material, in step 44, with water 43 sprinkled on the subgrade material laid in step 42.

Next, in step 45, pouring on top of the subgrade material a cementitious base 23 to a specified minimum thickness and to a second predetermined elevation, and screeding or rodding the freshly poured cementitious base, in step 46. Then forming and leaving a freshly poured cementitious base having a rough, unsmoothed and wet surface 30, in step 48, for achieving a monolithic cementitious reaction with a subsequently applied and simultaneously cured decorative aggregate-containing cementitious layer.

Screed boards are the boards used to form the boundary of the area to be poured with the cementitious composition. The top edge of the screed boards are set at the elevation desired or specified. Screeding or rodding is a term in the industry meaning dragging or pulling a wooden board or rod, usually a long 2 inch×4 inch board, or similarly-shaped steel member, laid over top edges of the screed boards to level the surface of a freshly poured cementitious layer. Screeding or rodding is performed in step 46 as well as step 75 described later. In step 46, however, screeding is deliberately stopped before achieving a smooth surface.

While, or preferably before, the above-described steps 40 to 48 are being carried out, a decorative aggregate 26 introduced at 50 is washed with water 52, in step 54, thereby producing a supply of clean decorative aggregate in step 56 that is free of detrimental material. Also, while the above-described steps 40 to 48 are being carried out, a pourable, or flowable, or pumpable cementitious matrix composition 28 is simultaneously prepared in step 60 by mixing silica sand 62 and water 64 in a mixer followed by adding and mixing cement 66 in the mixer. If desired, a colorant 68 is then added and mixed in the mixer to form the cementitious matrix composition. An example of a colorant is iron oxide.

The cleaned decorative aggregate produced in step 56 is then added and mixed with the cementitious matrix composition in step 70, to produce a pourable, or flowable, or pumpable decorative aggregate-containing cementitious slurry. Next, in step 72, the decorative aggregate-containing cementitious slurry is then applied to, or poured on, the rough, unsmoothed and wet surface of the freshly poured cementitious base produced and laid in step 48.

The labor-intensive step of hand seeding or broadcasting the decorative aggregate is not required in this process thereby greatly reducing the cost of construction and speeding installation of the structure.

To permanently secure the decorative aggregate in the subsequently cured monolithic structure the thickness of the decorative aggregate-containing cementitious layer must be sufficient that upon curing it will secure or lock in the largest size of the decorative aggregate employed. For example, it is recommended that if the decorative aggregate has a maximum size of ½ inch, that the decorative aggregate-containing cementitious layer be about ⅝ inch thick to secure or lock in the decorative aggregate while permitting at least a portion of the decorative aggregate to be exposed at the surface thereby forming, in step 74, a decorative aggregate-containing cementitious surface 34 having a portion of the decorative aggregate exposed.

Similarly, if the decorative aggregate has a maximum size of ⅜ inch, then the decorative aggregate-containing cementitious layer should be about ½ inch thick.

If the decorative aggregate has a maximum size of ¼ inch, then the decorative aggregate-containing cementitious layer should be about ⅜ inch thick.

If the decorative aggregate has a maximum size of ⅛ inch, then the decorative aggregate-containing cementitious layer should be about 3/16 inch thick.

If the decorative aggregate has a maximum size of 1/16 inch, then the decorative aggregate-containing cementitious layer should be about ⅛ inch thick.

If the decorative aggregate has a maximum size of 1/32 inch, then the decorative aggregate-containing cementitious layer should be about 1/16 inch thick.

To further enhance the appearance of the decorative aggregate-containing cementitious layer, the poured decorative aggregate-containing cementitious slurry is within about 30 minutes after pouring leveled in step 75, then within about 30 minutes after leveling bullfloated in step 76, then within 60 minutes after bullfloating troweled in step 77, and then immediately sponged in step 78. In other words, these steps are performed shortly after pouring and laying the decorative aggregate-containing cementitious slurry so that most of the monolithic forming cementitious reaction occurs after step 78, thereby insuring that no cold joint is formed between the freshly poured cementitious base and the decorative aggregate-containing cementitious slurry.

Leveling, carried out in step 75, is performed by screeding or rodding. However, as opposed to step 46, screeding in step 75 continues sufficiently to level and preliminarily smooth the top surface.

Bullfloating, carried out in step 76, is a term used in the industry meaning dragging a wooden board or similarly-shaped steel member, usually attached to a long pole, at an acute angle over the surface of an uncured cementitious layer to further smooth the surface thereof.

Troweling, carried out in step 77, is a term used in the industry meaning the operator, using knee boards if necessary, works his way over the uncured surface from one small area to another, using hand held trowels and smoothing the surface as he moves.

Sponging, carried out in step 78, is a term used in the industry meaning removing the excess cement film after troweling and is usually performed by the operator immediately following troweling before moving on his knee boards to the next small area to be troweled.

After completing the sponging carried out in step 78, the entire cementitious formation is allowed to cure, i.e. allowing the monolithic cementitious reaction to proceed undisturbed and form a harden surface. Curing is allowed to occur for about 7 days in step 80 while keeping the entire surface damp, before proceeding with subsequent surface treatments.

After the 7 day curing in step 80, the harden surface is brushed and lightly washed with a dilute acid to remove the laitance covering the exposed portion of the decorative aggregate in step 82. "Laitance" is a term used in the industry to mean the thin cementitious surface film left after curing. An effective dilute acid for washing is a mixture of one part by volume muriatic acid to ten parts by volume water. Muriatic is usually sold with a hydrochloric acid strength of from about 35% to about 38%.

After acid washing, the decorative aggregate-containing cementitious surface of the monolithic structure is allowed to become neutralized in 83. Neutralization can be determined by testing the surface with litmus paper or other means. The neutralized decorative aggregate-containing cementitious surface is then sealed with an effective sealant, as indicated in step 84. Acrylic based sealants are examples of effective sealants.

If the cementitious base poured in step 45 is at least about 3 to 3 ½ inches thick, and the decorative aggregate-containing cementitious layer is at least about 1/32 to ⅝ inch thick depending on the maximum size of the decorative aggregate, the monolithic structure produced upon curing will be sufficient to support heavy pedestrian traffic, and provide attractive walkways for amusement parks, sidewalks, patios, amusement parks streets, and hotel entrances and the like having long lasting and superior durability. For city streets the total thickness of the monolithic structure should meet or exceed specification, which can require between 6 and 8 inch thickness.

The cementitious materials when cured have known strength ratings. Specifications for the cementitious materials usually require that they have a certain minimum strength when cured to meet the requirement established by governmental bodies. In this invention, the freshly poured cementitious base and the decorative aggregate-containing cementitious slurry when cured each have a strength rating. In one embodiment of this invention, the strength rating of the freshly poured cementitious base when cured, and the strength rating of the decorative aggregate-containing cementitious slurry when cured, are about the same so that one of these materials will not deteriorate before the other. For example, if one material has a rating of 2200 psi, the other one should also have a rating of 2200 psi. Cementitious materials frequently have rating of 2200 psi, 3000 psi or 4000 psi depending on the usage that such cementitious materials are going to encounter.

EXAMPLE 1

A cementitious base is poured with an amount of mix sufficient to produce a 3 to 5 inch pour thickness. The amount of water preferably is sufficient to produce about a 3 to 5 inch slump test. For example, the following formulation produces a satisfactory cementitious base:

| %   | Ingredient                       |
|-----|----------------------------------|
| 16  | Riverside Type V Portland (ASTM C150) |
| 26  | No. 4 aggregate                  |
| 48  | Washed concrete sand             |
| 10  | water                            |
| 100 |                                  |

Primary aggregate gradation of No. 4 aggregate is as follows:

| % Passing | U.S. Standard Sieve     |
|-----------|-------------------------|
| 100       | ½ inch                  |
| 96        | ⅜ inch                  |
| 14        | #4                      |
| 4         | #8                      |
| 1         | #16                     |
| 5.85      | Fine Material (ASTM C125) |

A decorative aggregate-containing cementitious slurry is then immediately poured on the freshly poured cementitious base. The amount of the slurry is sufficient to produce a poured layer having a thickness effective for securing and locking in the decorative aggregate. The workability of the decorative aggregate-containing cementitious slurry must be effective for allowing operations through the final troweling, step 77 of FIG. 4.

The cementitious base and decorative aggregate-containing cementitious slurries of this invention produce monolithic structures having a design strength of 3000 psi or higher at 28 days.

The No. 4 aggregate adds strength to the cementitious base. No. 4 aggregate is much less costly than most all of the decorative aggregates of interests. No. 4 aggregate, or any other conventional aggregate used in conventional cement mixes merely for strength, does not produce the attractive or architectural surfaces of this invention, and therefore is not meant to included in the term "decorative aggregate" as used and claimed herein.

EXAMPLE 2

Non-limiting examples of decorative cementitious matrix blends of this invention are shown in TABLE 2. Decorative cementitious matrix blends A, B, D and E are darker than lighter blends G, H, J and K that are formulated to produce a whitish to light beige appearance. The fly ash in blends A and B retards the curing rate and allows more time to work with forming the decorative aggregate-containing surface. Silica fume is used to improve the decorative-aggregate binding strength of the decorative aggregate-containing surface. Other decorative cementitious matrix blends can, of course, be used in the process of this invention.

While the preferred embodiments of the present invention have been described, various changes, adaptations and modifications may be made thereto without departing from the spirit of the invention and the scope of the appended claims. The present disclosure and embodiments of this invention described herein are for purposes of illustration and example and modifications and improvements may be made thereto without departing from the spirit of the invention or from the scope of the claims. The claims, therefore, are to be accorded a range of equivalents commensurate in scope with the advances made over the art.

TABLE 1

| Type of Portland | Chemical Composition (%) | | | | | | Loss on Ignition | Insoluble Residue | Potential Compound Composition (%)[1] | | | | Blaine Fineness |
|---|---|---|---|---|---|---|---|---|---|---|---|---|---|
| Cement | $SiO_2$ | $Al_2O_3$ | $Fe_2O_3$ | CaO | MgO | $SO_3$ | (%) | (%) | $C_3S$ | $C_2S$ | $C_3A$ | $C_4AF$ | ($m^2$/kg) |
| I | 20.9 | 5.2 | 2.3 | 64.4 | 2.8 | 2.9 | 1.0 | 0.2 | 55 | 19 | 10 | 7 | 370 |
| III | 21.3 | 5.1 | 2.3 | 64.9 | 3.0 | 3.1 | 0.8 | 0.2 | 56 | 19 | 10 | 7 | 540 |
| V | 25.0 | 3.4 | 2.8 | 64.4 | 1.9 | 1.6 | 0.9 | 0.2 | 38 | 43 | 4 | 9 | 380 |
| White | 24.5 | 5.9 | 0.6 | 65.0 | 1.1 | 1.8 | 0.9 | 0.2 | 33 | 46 | 14 | 2 | 490 |

$C_3S = 3CaO \cdot SiO_2$ = Tricalcium silicate
$C_2S = 2CaO \cdot SiO_2$ = Dicalcium silicate
$C_3A = 3CaO \cdot Al_2O_3$ = Tricalcium aluminate
$C_4AF = 4CaO \cdot Al_2O_3 \cdot Fe_2O_3$ = Tetracalcium aluminoferrite
[1]Potential Compound Composition refers to the maximum compound allowable by ASTM C150 calculations using the chemical composition of the cement. The actual compound may be less due to incomplete or altered chemical reactions. Reference Steven H. Kosmatka and William C. Panarese, "Design and Control of Concrete Mixtures,"13th Edition, Portland Cement Association, 1994, 4th printing, page 21.

TABLE 2

| | Component in Parts by Weight | | | | | | | |
|---|---|---|---|---|---|---|---|---|
| Decorative Cementitious Matrix Blend | A | B | D | E | G | H | J | K |
| Blended Quartzitic Silica[1] | 40 | 40 | 40 | 40 | 40 | 40 | 40 | 40 |
| Portland Cement Type V | 15 | 16 | 18 | 18 | 0 | 0 | 0 | 0 |
| White Portland Cement | 0 | 0 | 0 | 0 | 19 | 19 | 18 | 18 |
| Silica Fume | 1 | 1 | 2 | 2 | 1 | 1 | 2 | 2 |
| Fly Ash C | 4 | 3 | 0 | 0 | 0 | 0 | 0 | 0 |

TABLE 2-continued

| | Component in Parts by Weight | | | | | | | |
|---|---|---|---|---|---|---|---|---|
| Decorative Aggregate[2] | 40 | 40 | 40 | 40 | 40 | 40 | 40 | 40 |
| Size Range Minimum-Inches | 3/8 | 1/4 | 1/32 | 1/8 | 3/8 | 1/4 | 1/32 | 1/8 |
| Size Range Maximum-Inches | 1/2 | 3/8 | 1/8 | 3/8 | 1/2 | 3/8 | 1/8 | 3/8 |
| Water[3] | | | | | | | | |

[1]The blended quartzitic silica is beige in A, B, D and E and white in G, H, J and K with a Standard Sieve Size gradation of 25% No. 16, 37% No. 20, 25% No. 30 and 13% No. 60.
[2]In A, B and D the decorative aggregates are nonwhite; in Blend E the decorative aggregates are nonwhite small sea shells and/or other sea crustations; in Blends G, H and J the decorative aggregates are white quartz marble or other white decorative aggregates; and in Blend K the decorative aggregates are white small sea shells and/or other sea crustations.
[3]An amount of water which when added to the combined Decorative Cementitious Blend and Decorative Aggregate produces slurries with sufficient fluidity through final troweling.

What is claimed is:

1. A process for producing a monolithic architectural cementitious structure having a decorative aggregate-containing cementitious surface comprising:
   a. forming a freshly poured cementitious base that is free of decorative aggregate;
   b. preparing a decorative aggregate-containing cementitious slurry having at least decorative aggregate and cementitious matrix composition operable for forming a monolithic structure when applied to the freshly poured cementitious base and simultaneously cured therewith;
   c. pouring an amount of the decorative aggregate-containing cementitious slurry having a slump between about 3 inches and about 5 inches on the freshly poured cementitious base within a period of time after forming the freshly poured cementitious base, effective for forming a monolithic structure, when simultaneously cured with the freshly poured cementitious base, the amount of the decorative aggregate-containing cementitious slurry producing a decorative aggregate-containing cementitious layer having a thickness operable, when cured, for permanently securing the decorative aggregate therein, at least a portion of the decorative aggregate forming a portion of a surface of the decorative aggregate-containing cementitious layer; and
   d. simultaneously curing
      i. the decorative aggregate-containing cementitious slurry poured on the freshly poured cementitious base, with ii. the freshly poured cementitious base, for a period of time effective for producing the monolithic architectural cementitious structure having the decorative aggregate-containing cementitious surface.

2. The process of claim 1, wherein the decorative aggregate-containing cementitious surface is produced without requiring hand seeding or broadcasting of the decorative aggregate.

3. The process of claim 1, wherein the decorative aggregate-containing cementitious surface is produced without requiring grinding of said surface.

4. The process of claim 1, further comprising leaving a rough, unsmoothed and wet surface on the freshly poured cementitious base, and pouring the decorative aggregate-containing cementitious slurry on the rough, unsmoothed and wet surface.

5. The process of claim 1, wherein the period of time for pouring the decorative aggregate-containing cementitious slurry on the freshly poured cementitious base is immediately after completing the pouring of the freshly poured cementitious base.

6. The process of claim 1, wherein the period of time for pouring the decorative aggregate-containing cementitious slurry on the freshly poured cementitious base is between about one minute and about 3 hours from the time of completing the pouring of the freshly poured cementitious base.

7. The process of claim 1, further comprising removing detrimental material from the decorative aggregate before preparing the decorative aggregate-containing cementitious slurry.

8. The process of claim 1, wherein the decorative aggregate is selected from the group consisting of natural hard materials, synthetic hard materials, and mixtures thereof that form attractive decorative aggregate-containing cementitious surfaces.

9. The process of claim 1, wherein the decorative aggregate is selected from the group consisting of ceramic, ceramic chips, marble, marble chips, granite, granite chips, sea shells, sea shells chips, sea crustacean remains, fragments of sea crustacean remains, glass, glass chips, natural aggregate selected for its color, natural aggregate selected for its texture, natural aggregate selected for its strength and attractiveness, and mixtures thereof.

10. The process of claim 1, wherein the period of time for simultaneously curing the decorative aggregate-containing cementitious slurry with the freshly poured cementitious base is about 7 days from the time of completing the pouring of the decorative aggregate-containing cementitious slurry.

11. The process of claim 1, wherein the decorative aggregate has a size between about 1/32 inch and about 3/8 inch.

12. The process of claim 1, wherein the decorative aggregate has a size between about 1/32 inch and about 1/4 inch.

13. The process of claim 1, wherein the decorative aggregate has a size between about 1/32 inch and about 3/16 inch.

14. The process of claim 1, wherein the freshly poured cementitious base has a thickness of at least about 3 inches.

15. The process of claim 1, wherein the decorative aggregate-containing cementitious layer has a thickness of between about 1/6 inch and about 5/8 inch.

16. The process of claim 1, wherein the monolithic architectural cementitious structure has a thickness of at least about 3 1/2 inches.

17. The process of claim 1, wherein the cementitious base forms at least about 83% of the monolithic architectural cementitious structure, and wherein the decorative aggregate-containing cementitious slurry forms at least about 2% of the monolithic architectural cementitious structure.

18. The process of claim 1, wherein the freshly poured cementitious base when cured has a strength rating, and wherein the decorative aggregate-containing cementitious slurry when cured has a strength rating that is at least equal to the strength rating of the freshly poured cementitious base when cured.

19. The process of claim 1, wherein the freshly poured cementitious base is formed from a cementitious base slurry having a slump between about 3 inches and about 5 inches.

20. The process of claim 1, wherein the decorative aggregate-containing cementitious surface is approximately horizontal.

21. The process of claim 1, further comprising, curing the decorative aggregate-containing cementitious surface for the period of time effective for permitting an acid wash to occur without detrimentally effecting the matrix, and thereafter washing the decorative aggregate-containing cementitious surface with a dilute acid to remove the laitance and brighten exposed decorative aggregate.

22. The process of claim 21, further comprising, after washing the decorative aggregate-containing cementitious surface with a dilute acid to brighten exposed decorative aggregate, allowing the decorative aggregate-containing cementitious surface to become neutralized, and thereafter sealing the neutralized decorative aggregate-containing cementitious surface with a sealant effective for protecting the decorative aggregate-containing cementitious surface.

23. The process of claim 1, further comprising, within about 30 minutes after pouring the decorative aggregate-containing cementitious slurry, leveling the decorative aggregate-containing cementitious surface.

24. The process of claim 23, further comprising within about 30 minutes after leveling the decorative aggregate-containing cementitious surface, bullfloating the decorative aggregate-containing cementitious surface and forming a smoothed surface.

25. The process of claim 24, further comprising within about 60 minutes after bullfloating the decorative aggregate-containing cementitious surface and forming the smoothed surface, troweling and sponging the decorative aggregate-containing cementitious surface to further enhance the appearance thereof.

26. The process of claim 1, wherein the decorative aggregate-containing cementitious slurry is formed from a mixture comprising:
   a decorative cementitious matrix blend having at least blended quartzitic silica in an amount between about 50% and about 79%, Portland cement in an amount between about 20% and about 35%, and silica fume up to about 5%;
   decorative aggregate; and
   an effective amount of water for forming the slurry.

27. The process of claim 26, wherein the ratio of decorative aggregate to decorative cementitious matrix blend is between about 20/60 and about 50/60.

28. The process of claim 27, wherein the effective amount of water for forming the slurry is operable for forming a slurry having sufficient fluidity for working the slurry through a final troweling step of the production of a smooth decorative aggregate-containing surface.

29. The process of claim 1, wherein the cementitious matrix composition comprises at least silica sand and cement.

30. The process of claim 29, wherein the cementitious matrix composition further comprises at least silica fume.

31. The process of claim 29, wherein the cementitious matrix composition further comprises at least fly ash.

32. The process of claim 29, wherein the cementitious matrix composition further comprises at least silica fume and fly ash.

33. The process of claim 29, wherein the decorative aggregate-containing cementitious slurry further comprises a colorant.

34. A process for producing a monolithic architectural cementitious structure having a decorative aggregate-containing cementitious surface comprising:
  a. forming a freshly poured cementitious base that is free of decorative aggregate;
  b. preparing a decorative aggregate-containing cementitious slurry having at least decorative aggregate and cementitious matrix composition operable for forming a monolithic structure when applied to the freshly poured cementitious base and simultaneously cured therewith;
  c. pouring an amount of the decorative aggregate-containing cementitious slurry having a slump between about 3 inches and about 5 inches on the freshly poured cementitious base within a period of time after forming the freshly poured cementitious base, effective for forming a monolithic structure, when simultaneously cured with the freshly poured cementitious base, wherein said period of time is between about one minute and about 3 hours from the time of completing the pouring of the freshly poured cementitious base,
    the amount of the decorative aggregate-containing cementitious slurry producing a decorative aggregate-containing cementitious layer having a thickness operable, when cured, for permanently securing the decorative aggregate therein,
    at least a portion of the decorative aggregate forming a portion of a surface of the decorative aggregate-containing cementitious layer; and
  d. simultaneously curing
    i. the decorative aggregate-containing cementitious slurry poured on the freshly poured cementitious base, with
    ii. the freshly poured cementitious base, for a period of time effective for producing the monolithic architectural cementitious structure having the decorative aggregate-containing cementitious surface, and wherein there is no cold joint between the decorative aggregate-containing cementitious layer and the cementitious base.

35. The process of claim 34, wherein the freshly poured cementitious base is formed from a cementitious base slurry having a slump between about 3 inches and about 5 inches.

36. The process of claim 34, wherein the decorative aggregate-containing cementitious surface is approximately horizontal.

37. A process for producing a monolithic architectural cementitious structure having a decorative aggregate-containing cementitious surface comprising:
  a. forming a freshly poured cementitious base that is free of decorative aggregate and has a thickness of at least about 3 inches;
  b. preparing a decorative aggregate-containing cementitious slurry having a slump between about 3 inches and about 5 inches, and having at least decorative aggregate and cementitious matrix composition operable for forming a monolithic structure when applied to the freshly poured cementitious base and simultaneously cured therewith, wherein the decorative aggregate has a size of between about $\frac{1}{32}$ inch and about $\frac{1}{2}$ inch;
  c. pouring an amount of the decorative aggregate-containing cementitious slurry on the freshly poured cementitious base within a period of time after forming the freshly poured cementitious base, effective for forming a monolithic structure, when simultaneously cured with the freshly poured cementitious base,
    the amount of the decorative aggregate-containing cementitious slurry producing a decorative aggregate-containing cementitious layer having a thickness operable, when cured, for permanently securing the decorative aggregate therein, and a thickness of at least about $\frac{1}{16}$ inch,
    at least a portion of the decorative aggregate forming a portion of a surface of the decorative aggregate-containing cementitious layer; and
  d. simultaneously curing
    i. the decorative aggregate-containing cementitious slurry poured on the freshly poured cementitious base, with
    ii. the freshly poured cementitious base, for a period of time effective for producing the monolithic architectural cementitious structure having the decorative aggregate-containing cementitious surface.

38. The process of claim 37, wherein the freshly poured cementitious base is formed from a cementitious base slurry having a slump between about 3 inches and about 5 inches.

39. The process of claim 37, wherein the decorative aggregate-containing cementitious surface is approximately horizontal.

* * * * *